United States Patent Office 2,706,733
Patented Apr. 19, 1955

2,706,733

FLUORINATED ISOCYANATES AND CARBAMYL CHLORIDES

Thomas S. Reid, New Canada Township, Ramsey County, Minn., assignor to Minnesota Mining & Manufacturing Company, St. Paul, Minn., a corporation of Delaware No Drawing. Application March 13, 1950,
Serial No. 149,457

7 Claims. (Cl. 260—453)

This invention relates to my discovery of a new and useful class of reactive fluorocarbon compounds having novel properties and useful as chemical intermediates, and to a method of making them.

These new compounds are the 1,1-dihydroperfluoroalkyl isocyanates, wherein the molecule contains a non-cyclic saturated fluorocarbon group (normal or branched) joined to an isocyanatomethyl group (—CH₂N:C:O) having a carbon atom to which two hydrogen atoms are bonded. These compounds are represented by the general formula:

$$C_nF_{2n+1}CH_2N:C:O$$

where $n$ has a value of 1 to 12 in defining the compounds claimed herein. The invention also includes the corresponding carbamyl chlorides, represented by the general formula:

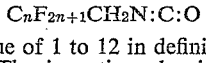

I have discovered that these isocyanate compounds can be conveniently prepared by the reaction, in a high-boiling anhydrous inert solvent vehicle, of phosgene (COCl₂) and the corresponding 1,1-dihydroperfluoroalkylamine compound, having the formula $C_nF_{2n+1}CH_2NH_2$. A three-stage reaction procedure is used. The amine is dissolved in the inert solvent (such as dry ethylene glycol diethyl ether) and phosgene gas is introduced with cooling of the reaction mixture to maintain a temperature of about 0° C.; then the reaction mixture is permitted to slowly rise to room temperature without introduction of phosgene; and then additional phosgene is introduced and the reaction mixture is heated to a moderately elevated temperature. The carbamyl chloride compound is formed as an intermediate and is the precursor of the isocyanate product, which is recovered by distillation and is further purified by removing traces of hydrogen chloride. If desired, the carbamyl chloride can be recovered as such from the reaction mixture and in certain cases it can be directly used in place of the isocyanate as a chemical intermediate, or it can be heated to form the corresponding isocyanate to be used as a chemical intermediate.

These new isocyanate compounds are colorless liquids or waxy solids, depending on the number of carbon atoms. The first nine members of the normal series have boiling points (at 740 mm. pressure) which are approximately as follows:

| | B. P. (° C.) |
|---|---|
| CF₃CH₂N:C:O | 55 |
| C₂F₅CH₂N:C:O | 72 |
| C₃F₇CH₂N:C:O | 91 |
| C₄F₉CH₂N:C:O | 110 |
| C₅F₁₁CH₂N:C:O | 127 |
| C₆F₁₃CH₂N:C:O | 147 |
| C₇F₁₅CH₂N:C:O | 167 |
| C₈F₁₇CH₂N:C:O | 184 |
| C₉F₁₉CH₂N:C:O | 203 |

These isocyanate compounds are highly reactive despite the presence in the molecule of a saturated fluorocarbon radical. The saturated fluorocarbons are highly inert and stable. However, the linking of the fluorocarbon radical to the isocyanate function by means of a methylene group results in compounds which are highly reactive. Hence these compounds have a wide applicability as intermediates for the synthesis of other carbon compounds, providing a means of introducing fluorocarbon radicals into compounds of various structures. They can be used in making synthetic resins and polymers, dyes, medicinals, insecticides.

The isocyanates can be easily converted to the corresponding carbamyl chlorides by reaction with anhydrous hydrogen chloride.

A feature of my invention is that I have provided compounds which contain a plurality of carbon atoms in the fluorocarbon radical, as well as the first member of the series which contains only one carbon atom that is fluorinated. Compounds containing a polycarbon fluorocarbon chain attached to the reactive function are valuable for making a variety of derivatives wherein the presence of a fluorocarbon chain is desirable to obtain special properties. For example, a fluorocarbon chain has a marked effect on surface active properties, providing the molecule with a fluorocarbon "tail" which is both hydrophobic and oleophobic at room temperature.

These new isocyanate compounds have been found to undergo the usual reactions of isocyanates with compounds which contain active hydrogen atoms. Reaction with amines is vigorous and exothermic, resulting in the formation of disubstituted ureas.

Reaction with water yields the symmetrical, disubstituted ureas. Thus 1,1-dihydrotrifluoroethyl isocyanate, CF₃CH₂N:C:O, gives bis (1,1-dihydrotrifluoroethyl)-urea, having the formula:

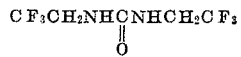

This is a solid compound having a melting point of about 157° C. As a further example, 1,1-dihydroheptafluorobutyl isocyanate, C₃F₇CH₂N:C:O, gives bis(1,1-dihydroheptafluorobutyl)-urea, having the formula:

This compound has a melting point of about 121° C.

Reaction of these isocyanates with polyvinyl alcohol results in fluorinated polyvinyl carbamates (urethanes) having N-bonded side chains terminating with perfluoroalkyl radicals. These polymers are highly water-repellent, especially when the fluorocarbon radical is a chain containing three or more carbon atoms, and can be used for coating cloth, paper and cellulosic films. The isocyanates can also be employed for treating textiles, papers and cellulosic films to obtain water-repellency and fire-resistance.

The following experimental examples illustrate the previously mentioned method of making my novel compounds.

EXAMPLE 1

The reaction vessel was a dry 100 ml. 3-necked glass flask equipped with a stirrer, a thermometer, a water-cooled reflux condenser, and a gas inlet tube. The flask was cooled during the first stage of the process by means of an ice-salt bath. The flask was charged with 45 grams of dry ethylene glycol diethyl ether, serving as an anhydrous, inert solvent vehicle. Then 22 grams of 1,1-dihydrotrifluoroethylamine (CF₃CH₂NH₂) was distilled into the flask from a mixture with freshly calcined calcium oxide, this procedure being used to insure that the amine was in an anhydrous condition. Phosgene gas from a supply tank was then run into the flask, with constant stirring, at such a rate that the temperature of the reaction mixture did not exceed 5° C. The phosgene was shut off after a substantial excess had been introduced, and the mixture was allowed to slowly rise to room temperature, the cooling bath being removed. The addition of phosgene was resumed and the flask was slowly heated by an electric mantle to 50–55° C. and maintained at this temperature for two hours.

Repeated distillation (to substantially eliminate hydrogen chloride) gave 5.3 grams of 1,1-dihydrotrifluoroethyl isocyanate, CF₃CH₂N:C:O, having a boiling range of 53–56° C. (at 747 mm.), a density of 1.387 (grams/cc. at 27° C.) and a refractive index of 1.3486 ($n_D/27$).

EXAMPLE 2

The procedure was the same as in the preceding example except that a reaction temperature of 40–45° C. was used at the end of the reaction.

From 10 grams of 1,1-dihydropentafluoropropylamine ($C_2F_5CH_2NH_2$), dissolved in 20 cc. of dry ethylene glycol diethyl ether, there was obtained 6.3 grams of crude 1,1-dihydropentafluoropropyl isocyanate, $$C_2F_5CH_2N:C:O$$

boiling at 68–74° C. (at 757 mm.). After purification by fractional distillation, the material had a boiling point of 72° C. (at 757 mm.), a density of 1.484 (grams/cc. at 20° C.), and a refractive index of 1.3350 ($nD/20$).

Reaction with water gave the disubstituted urea, $C_2F_5CH_2$—NH—CO—NH—$CH_2C_2F_5$, which was purified by recrystallization from chloroform, and was found to have a melting point of 166–167° C.

EXAMPLE 3

The procedure was the same as in the preceding examples except that a reaction temperature of 70–75° C. was used at the end of the reaction.

From 30 grams of 1,1-dihydroheptafluorobutylamine ($C_3F_7CH_2NH_2$), dissolved in 60 cc. of dry ethylene glycol diethyl ether, there was obtained 25.1 grams of crude 1,1-dihydroheptafluorobutyl isocyanate, $C_3F_7CH_2N:C:O$, boiling at 65–87° C. (at 721 mm.). After purification to remove hydrogen chloride, the material had a boiling point of 90° C. (at 737 mm.), a melting point of −78° C., a density of 1.512 (grams/cc. at 20° C.), and a refractive index of 1.3152 ($nD/20$).

Another procedure for removing hydrogen chloride is to distill in the presence of a hydrogen chloride acceptor, such as tetraphenyl tin.

In the case of higher members of the series, hydrogen chloride can be conveniently removed by refluxing the isocyanate while passing anhydrous nitrogen through it.

The corresponding carbamyl chloride compound was prepared by adding dry hydrogen chloride gas for 20 minutes to a portion of the above isocyanate compound, $C_3F_7CH_2N:C:O$. The reaction was exothermic. The product, which was a liquid having a melting point of about 9° C., was identified as 1,1-dihydroperfluorobutyl carbamyl chloride, $C_3F_7CH_2NHCOCl$. Infrared absorption analysis showed the presence of N—H and —C:O groups while the —N:C:O group was no longer present, thus confirming the identification.

EXAMPLE 4

The procedure was similar to that used in the preceding examples except that a different solvent (dioxane) and a higher final temperature (100° C.) were used.

From 10 grams of 1,1-dihydrononadecafluorodecylamine ($C_9F_{19}CH_2NH_2$) dissolved in 25 cc. of dry dioxane there was obtained 5.3 grams of crude 1,1-dihydrononadecafluorodecyl isocyanate, $C_9F_{19}CH_2N:C:O$, boiling at 93° C. (at 14 mm.). The reaction mixture was freed of undesirable gases by purging with dry nitrogen before distillation. Redistillation gave a purified product having a boiling point of 80° C. at 1 mm. pressure and a micro-boiling point of 203° C. at 746 mm. The product was a waxy solid having a celery-like odor, with a melting point of 46–47° C.

Reaction with water gave the bis disubstituted urea, having a formula:

$$C_9F_{19}CH_2NHCNHCH_2C_9F_{19}$$
$$\|$$
$$O$$

This was a solid compound having a melting point of 144–146° C.

Reaction with aniline gave the substituted urea compound having the formula:

$$C_6H_5NHCNHCH_2C_9F_{19}$$
$$\|$$
$$O$$

This compound had a melting point of 137–138° C.

Preparation of amine starting compounds

The starting compounds employed in the previously described method of making the isocyanate compounds of the present invention, are the 1,1-dihydroperfluoroalkylamines, having the general formula:

$$C_nF_{2n+1}CH_2NH_2$$

These starting compounds can be made by reduction of the corresponding fluorocarbon amide compounds, $$C_nF_{2n+1}CONH_2$$

using lithium aluminum hydride, $LiAlH_4$; the over-all result of the process being to replace the —$CONH_2$ amide group by a —$CH_2NH_2$ aminomethyl group to result in the amine product compound.

The amines which have three or more carbon atoms in the fluorocarbon chain can be prepared by conducting the reaction in dry ether solution, destroying excess $LiAlH_4$ by adding water, adding an excess of sulfuric acid to precipitate the amine in the form of an insoluble sulfate salt (or adding hydrochloric acid to precipitate an insoluble hydrochloride salt), filtering out the salt and drying, treating the solid with a concentrated solution of alkali to release the amine product compound which can be distilled out and recovered by condensation. The crude amine compound can be further purified by distillation. In the case of the $C_3F_7CH_2NH_2$ product, it will contain a few percent of water, which can be removed by mixing the amine with freshly calcined calcium oxide and distilling off the anhydrous amine compound. The higher members of the series are water-insoluble but may contain traces of water and can likewise be dehydrated if desired. The reaction vessel employed for the reduction reaction should be rigorously dry and dry, oxygen-free, nitrogen should be flowed through the apparatus to prevent fire, owing to the fact that $LiAlH_4$ is sensitive to $H_2O$ and $CO_2$ in the air and is spontaneously inflammable with water.

The foregoing procedure can be utilized in modified form, as hereinafter described, for making the first two members of the series ($CF_3CH_2NH_2$ and $C_2F_5CH_2NH_2$). The preparation of these amine compounds is described in more detail in the copending application of D. R. Husted and A. H. Ahlbrecht, S. N. 149,458, filed of even date herewith.

The above-mentioned fluorocarbon amides, having the formula $C_nF_{2n+1}CONH_2$ can be prepared by ammonolysis of the corresponding fluorocarbon acid fluorides, having the formula $C_nF_{2n+1}COF$.

The fluorocarbon acid fluorides can be made by electrolyzing a solution of anhydrous liquid hydrogen fluoride containing a dissolved hydrocarbon monocarboxylic acid ($C_nH_{2n+1}COOH$) of corresponding carbon skeletal structure, or its anhydride, by passing direct current through the solution at a cell voltage which is insufficient to generate molecular (free elemental) fluorine under the existing conditions, but which is sufficient to cause the formation of the fully fluorinated acid fluoride at a useful rate. The latter is relatively insoluble in the electrolyte solution and either settles to the bottom of the cell from which it can be drained with other fluorocarbon products of the process, or is volatilized and evolves from the cell in admixture with the hydrogen and other gaseous products. Reaction of the acid fluoride with ammonia produces the amide, a solid compound which can readily be separated and purified.

A simple electrolytic cell can be used, having steel cathodes and nickel anodes, operated at about 0° C. and atmospheric pressure, the applied cell voltage being about 5–6 volts D. C.

The fluorocarbon amides can also be conveniently prepared by reacting the corresponding alkyl esters with ammonia.

The electrochemical process is described and claimed in the copending application of J. H. Simons, S. N. 62,496, filed November 29, 1948, since issued as Patent No. 2,519,983 on August 22, 1950. Fluorocarbon acid fluorides, amides, acids, and alkyl esters of the fluorocarbon acids, containing from 3 to 9 carbon atoms in the fluorocarbon group, are described and claimed in the copending application of A. H. Diesslin, E. A. Kauck and J. H. Simons, S. N. 70,154, filed January 10, 1949, since issued as Patent No. 2,567,011 on September 4, 1951, which also describes the electrochemical process. Heptafluorobutyric acid and various of its derivatives (including the acid fluoride, the amide, and alkyl esters) have been described in a brochure published by Minnesota Mining & Manufacturing Company (St. Paul, Minnesota) in October 1949, as advertised in Chemical and Engineering News, issue of October 17, 1949, at page 3061.

The following experimental examples illustrate in detail the preparation of the 1,1-dihydroperfluoroalkyl-amines which are employed as starting compounds.

The first illustration relates specifically to the preparation of $C_3F_7CH_2NH_2$ but the procedure can also be employed in making higher members of the series.

The reaction apparatus was a dry 3000 ml. 3-necked glass flask equipped with a stirrer, a water-cooled reflux condenser, a dropping funnel, and a gas inlet tube so that dry nitrogen could be flowed through the system. The apparatus was dried at 120° C. before use, and assembled while still hot with dry oxygen-free nitrogen passing through the apparatus.

(WARNING.—Precautions must be observed in using the lithium aluminum hydride reduction agent. It is sensitive to $H_2O$ and $CO_2$ in the air, is spontaneously inflammable with water, and inflames on rubbing unprotected in a mortar. It should be ground in a mortar under a nitrogen atmosphere, and should be added rapidly to the flask with a slow nitrogen stream flowing through the system. In case of a fire, do not use a water or carbon dioxide fire extinguisher. Use nitrogen or dry sodium chloride as an extinguisher.)

With nitrogen flowing through the system (a flow of 0.1 to 0.2 cubic foot per hour is sufficient during the reaction), the flask was charged with 1200 ml. of dry diethyl ether and then with 44.6 grams (1.172 mols) of powdered $LiAlH_4$. The suspension was stirred until the $LiAlH_4$ had dissolved, leaving only a slight haze of insoluble impurities in suspension. Two hours of stirring is usually sufficient.

To the solution was added 100 grams (0.469 mol) of heptafluorobutyramide ($C_3F_7CONH_2$) dissolved in dry diethyl ether, the addition being made slowly enough to maintain a gentle reflux while the reaction flask was cooled in an ice bath. The stirring was continued for two hours with cooling, and then for a further period of 2½ hours (without cooling) with gentle reflux taking place.

At the end of the reflux period the flask was cooled with an ice-salt mixture. The nitrogen flow was increased to 2 cu. ft./hr. Water was added dropwise until hydrogen was no longer evolved, so as to decompose the excess $LiAlH_4$, and a few ml. additional water was added as a safety measure. (Nitrogen must be flowing through the apparatus during the addition of the water as otherwise there is considerable danger of fire. The water inlet tube should extend almost to the level of the ether so that no water strikes the side of the flask where a film of unreacted $LiAlH_4$ may have collected.)

With continued cooling of the flask, addition was made of an ice-cold solution of 260 ml. (4.9 mols) of concentrated sulfuric acid in 1000 ml. of water. This resulted in the formation of an insoluble bisulfate salt of the amine, precipitated by the excess of sulfuric acid. This was removed by filtration and dried in an oven at 100° C.

The dried salt was ground in a mortar to a fine powder and placed in a 500 ml. 3-necked flask equipped with a dropping funnel, stirrer, and distilling head. A 50% solution of sodium hydroxide (about 4 mols) was added until the resulting solution became basic (pH of 11 by Hydrion paper). The crude amine was distilled out on heating (B. P. 60–65° C.), and was then redistilled through a 6–8 plate fractionating column and the fraction distilling at 65–66° C. (at about 736–740 mm. pressure) was collected. The yield was about 45 grams (50%).

The product contained about 2–3% water and was dehydrated by distillation from freshly calcined calcium oxide. The resultant pure amine, $C_3F_7CH_2NH_2$, is a liquid having a boiling point of about 68° C. (at 740 mm.), a density of 1.493 (grams/cc. at 20° C.) and a refractive index of 1.298 ($nD/20$).

For making 1,1-dihydropentafluoropropylamine, $C_2F_5CH_2NH_2$, from the corresponding amide, $$C_2F_5CONH_2$$

the foregoing procedure can be utilized in modified form as follows: Extract the sulfuric acid solution with ether (to remove the aldehyde hydrate by-product). Make the aqueous solution basic, then extract this basic solution with ether. Add anhydrous hydrogen chloride to the last-mentioned ether extract to precipitate the amine in the form of the hydrochloride salt, filter out the latter, dry and treat with concentrated sodium hydroxide solution to release the amine, and recover the amine by distillation. The crude amine is then purified by fractional distillation and dehydration. This $C_2F_5CH_2NH_2$ compound has a boiling point of about 49° C. at 740 mm., a density of 1.400 (grams/cc. at 20° C.), and a refractive index of 1.297 ($nD/20$).

In making 1,1-dihydrotrifluoroethylamine, $$CF_3CH_2NH_2$$

from the corresponding amide, $CF_3CONH_2$, it has been found desirable to employ tetrahydrofuran instead of ether as the reaction medium. Water is added to the reaction mixture and the amine is recovered from the resultant basic solution by distillation. This amine has a boiling point of about 37° C. (at 740 mm.).

The following illustrates the preparation of $$C_9F_{19}CH_2NH_2$$

A dry 1000 ml. flask, equipped as described above, was used as the reaction vessel, and the same precautions as to nitrogen flow, and otherwise, were observed during the course of the reaction procedures.

To the flask was added 200 ml. of dry diethyl ether and 5.5 grams (0.146 mols) of powdered $LiAlH_4$, and the suspension was stirred until the latter had dissolved. Then addition was made of 25 grams (0.0486 mol) of normal nonadecafluorocapric amide ($C_9F_{19}CONH_2$) suspended in 200 ml. of dry diethyl ether. The insoluble portion of the amide was washed in with successive portions of dry ether. The addition was made slowly enough to maintain only gentle reflux while the reaction flask was cooled in an ice bath. The stirring was continued for 2 hours with cooling and for 2½ hours longer at gentle reflux. At the end of the reflux period the flask was cooled with an ice-salt mixture and water was added dropwise until hydrogen was no longer evolved, and then a few ml. of additional water was added as a safety measure.

With continued cooling, 100 ml. of ice-cold concentrated hydrochloric acid was added, which served to precipitate the hydrochloride salt of the amine reaction product, which was insoluble in the excess acid. The precipitate was removed by filtration, dried, and sublimed in a high vacuum at about 65–100° C. ($10^{-5}$ mm. pressure). The product was pure white.

This was placed in a small distilling flask with an excess of 50% aqueous sodium hydroxide solution (about 5 ml., 0.06 mol sodium hydroxide), and slowly distilled. The amine passed over with the steam and partly solidified. It was extracted with ether. The amine was recovered by evaporating the ether and was purified by distilling in high vacuum. The pure amine ($C_9F_{19}CH_2NH_2$) has a melting point of about 48° C. and a boiling point (micro) of about 183° C. (at 740 mm.).

What I claim is as follows:

1. As new and useful compounds, the 1,1-dihydroperfluoroalkyl isocyanate compounds represented by the formula:

$$C_nF_{2n+1}CH_2N:C:O$$

where $n$ has an integer value of 1 to 12.

2. As new and useful compounds, the carbamyl chlorides of 1,1-dihydroperfluoroalkyl isocyanates represented by the formula:

$$C_nF_{2n+1}CH_2NHCCl\atop\|\atop O$$

where $n$ has an integer value of 1 to 12.

3. The compound 1,1-dihydrotrifluoroethyl isocyanate, having the formula $CF_3CH_2N:C:O$.

4. The compound 1,1-dihydropentafluoropropyl isocyanate, having the formula $C_2F_5CH_2N:C:O$.

5. The compound 1,1-dihydroheptafluorobutyl isocyanate, having the formula $C_3F_7CH_2N:C:O$.

6. The compound 1,1-dihydrononafluoroamyl isocyanate, having the formula $C_4F_9CH_2N:C:O$.

7. The compound 1,1-dihydrononadecafluorodecyl isocyanate, having the formula $C_9F_{19}CH_2N:C:O$.

References Cited in the file of this patent

UNITED STATES PATENTS

| | | |
|---|---|---|
| 2,362,648 | Lichty | Nov. 14, 1944 |
| 2,428,843 | Georges | Oct. 14, 1947 |

OTHER REFERENCES

Huckel: Nachr. Akad. Wiss. Gottingin Math.-physik Klasse (1946), pages 36–37, as abstracted in Chem. Abstracts, vol. 43, column 6793 (1949).